Patented Mar. 8, 1949

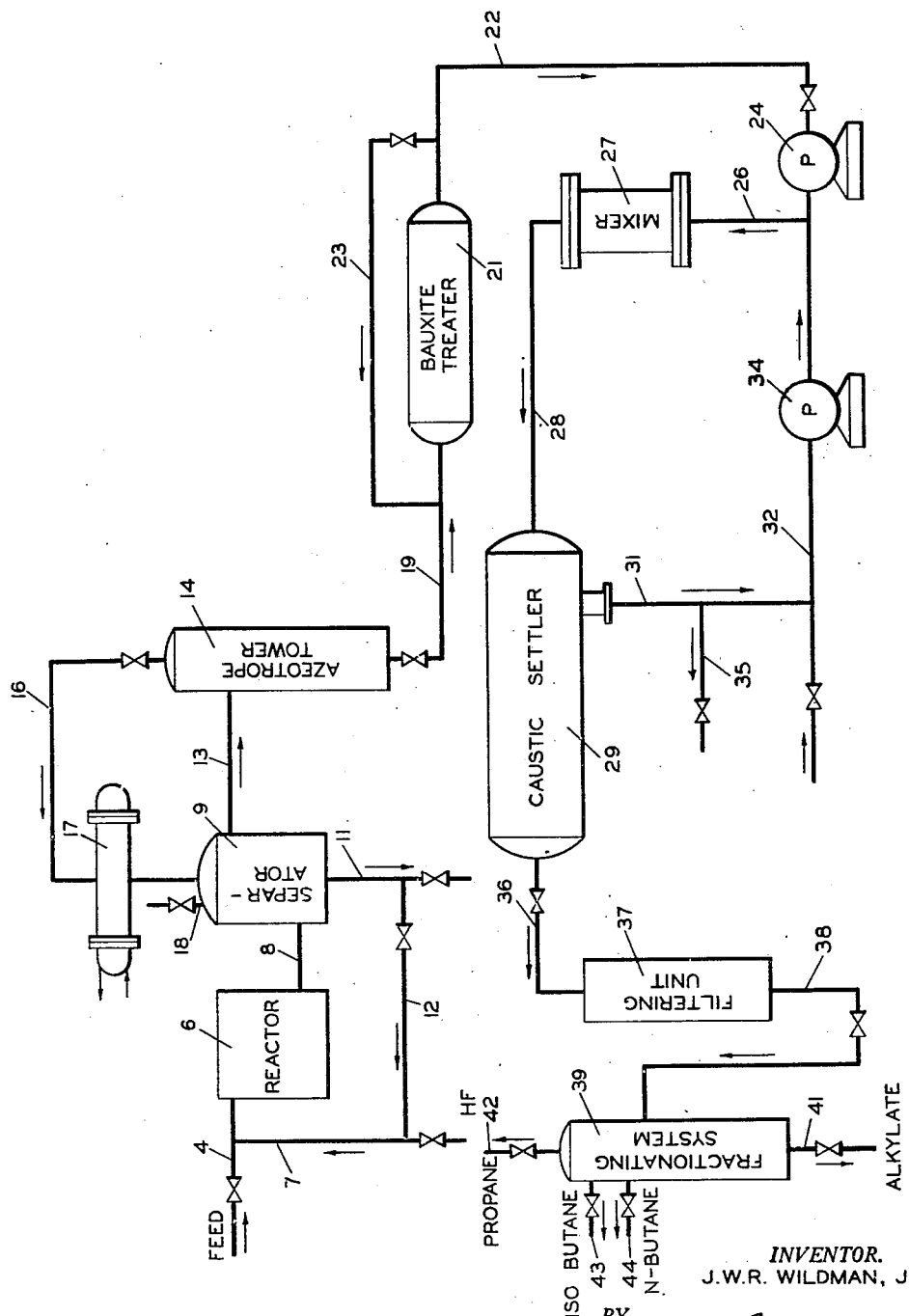

2,463,930

UNITED STATES PATENT OFFICE 2,463,930

REMOVAL OF SILICEOUS MATERIALS FROM HYDROCARBON MIXTURES

John Wendell Ralph Wildman, Jr., Overland Park, Kans., assignor to Phillips Petroleum Company, a corporation of Delaware Application August 21, 1945, Serial No. 611,867

5 Claims. (Cl. 260—683.4)

This invention relates to the treatment of hydrocarbon materials. In one particular embodiment this invention relates to the prevention of siliceous deposits which may accumulate in condensers used in the fractionation of hydrocarbons. In one particular aspect this invention relates to the removal of inorganic fluorine and/or silicon compounds, such as silicon tetrafluoride, from a hydrocarbon stream in which the fluorine and/or silicon compounds are present as impurities formed in a process for the conversion of hydrocarbons in the presence of fluorine-containing catalysts.

In the manufacture of hydrocarbons by processes in which fluorine-containing catalysts are used, small proportions of organic fluorine-containing by-products are formed. These processes may involve reactions such as polymerization, isomerization, and alkylation of relatively low-boiling hydrocarbons to produce motor-fuel of high octane quality and are effected in the presence of catalysts comprising one or more of such fluorine compounds as hydrofluoric acid, boron trifluoride, or the like. Although the exact nature or composition of the organic fluorine-containing by-products which may be formed has not been definitely established, they are believed to be predominantly alkyl and/or aryl fluorides. These fluorides are not completely removed by washing the hydrocarbons with alkali solutions such as aqueous solutions of sodium hydroxide or sodium carbonate. The fluorides tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

As discussed in Frey Patent 2,347,945, issued May 2, 1944, such organic fluorine compounds may be removed from hydrocarbon materials containing them by contacting such a hydrocarbon material with any one of a number of solid porous contact materials. Contact materials which have been found suitable include those known to be catalytically active for hydrogenation and dehydrogenation reactions such as alumina gel, activated alumina, dehydrated bauxite, chromium oxide, mixtures of alumina and chromium oxide, chromium ores comprising chromium oxide and ores of related materials such as those containing zirconia, limestone, magnesia, and the like. Such contact materials appear to adsorb preferentially the organic fluorine compounds although the exact mechanism involved is not known at present. Materials which contain large quantities of silicon dioxide or of various naturally occurring silicates are generally not suitable for such treatment, but many of the naturally occurring ores which can be so used contain appreciable amounts of silica or silicates. One such material which has found wide commercial use is hard granular bauxite. Such bauxite has a variable composition, which may be exemplified by the following typical analysis, in per cent by weight:

| Substance | Per Cent |
|---|---|
| $Al_2O_3$ | 77.5 |
| $SiO_2$ | 9.4 |
| $TiO_2$ | 3.4 |
| $Fe_2O_3$ | 6.0 |
| $H_2O$ | 1.7 |
| V. M. | 2.0 |
| Total | 100.0 |

The presence of silica is undesirable because it causes the formation of silicon tetrafluoride. Nevertheless, in practice bauxite containing up to 15 and even 20 per cent of silica has been used, in the absence of any alternative readily available and economical material. When the bauxite has become partially spent for such use and/or when the hydrocarbon material being treated is passed through the mass of contact agent at a high flow rate, it has been found that silicon tetrafluoride is present in the effluent; also, some water, which appears to be formed by reaction of the fluorine compounds with the bauxite, is present in the effluents. That is, after conversion of the hydrocarbons, either in the liquid or vapor phase, in the presence of fluorine-containing catalysts, such as hydrogen fluoride, boron trifluoride, or the like, silicon tetrafluoride is formed when the hydrocarbon conversion effluent is contacted with contact materials containing minor proportions of silica. Thus, the conversion effluent after removal of the organic fluorine compounds comprises the conversion product, various lower-boiling by-products formed during conversion, and the relatively low-boiling silicon tetrafluoride and water.

It is necessary, in most cases, to remove the organic fluorine compounds by contacting the hydrocarbon effluent with a suitable contact material; but as a result of this treatment silicon tetrafluoride and water are liberated by the reaction of hydrogen fluoride or the organic fluorine compounds with silica present as an impurity in the contact material. Typical equations of reactions which may occur in the treatment of the effluent with bauxite are:

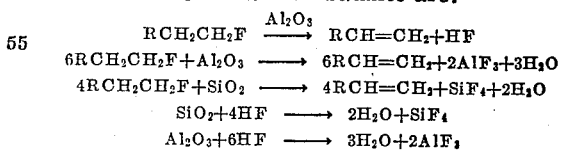

Although bauxite has been referred to in particular, any type of contact material suitable for the absorption of organic fluorine compounds in which minor proportions of silica are present are within the scope of this invention.

After being formed, the silicon tetrafluoride and the water are conveyed along with the hydrocarbon effluent from the contact material to subsequent treating equipment, which is usually fractionating equipment, for the separation and purification of the conversion product. The silicon tetrafluoride and water accumulate in the overhead fractions from the various fractionators, since they comprise some of the low-boiling components of the hydrocarbon effluent. In consequence, trouble is experienced in the subsequent treating equipment as a result of the silicon tetrafluoride reacting with water to form various solid siliceous deposits. When the effluent of the bauxite treating step just discussed is in the liquid phase, and the proportions of silicon tetrafluoride and water are so small that these materials are completely dissolved, relatively little or only minor trouble may be experienced, if any. However, when much of the heavier hydrocarbon materials have been removed by fractional distillation so that the concentrations of the silicon tetrafluoride and the water are increased, and especially when the temperature is so low that free liquid water separates from the hydrocarbon mixture, the silicon tetrafluoride reacts with the water, forming siliceous solids that accumulate, thereby partially or completely plugging equipment and necessitating an expensive shutdown and interruption of production in order to remove the siliceous deposits.

The following equations are illustrative of reactions involved in the hydrolysis of silicon tetrafluoride:

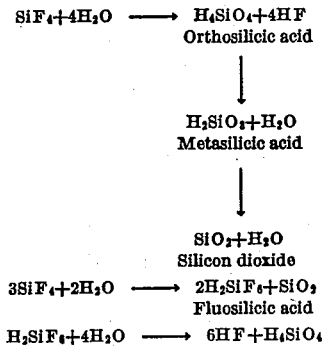

The formation of orthosilicic acid results in a gel-type deposit which tends to accumulate and plug the condenser tubing and reflux pipes and valves. Under appropriate conditions orthosilicic acid decomposes to metasilicic acid or silicon dioxide, which are precipitates and which also obstruct the passage of hydrocarbons through the condensers and tubings of the fractionating equipment.

The amount of organic fluorine present in the charge to the treating step for the removal of fluorine compounds generally is not more than about 0.1 per cent by weight and often is not more than 0.001 to 0.05 per cent by weight. Most of this organic fluorine is retained by the treating agent, and the silicon tetrafluoride in the effluent from this treating step generally is less than about 0.01 per cent by weight, and often is less than 0.005 per cent by weight. Nevertheless, in commercial plants, wherein several hundred barrels of hydrocarbons are treated per day and the silicon tetrafluoride reacts with water to form solid siliceous deposits in certain specific locations, such as the condenser and accumulator of a deisobutanizer or a depropanizer, the amount of solid siliceous material accumulated over a period of a few weeks or a few months amounts to a very substantial amount.

This invention constitutes an improvement in the removal of silicon tetrafluoride from a hydrocarbon conversion effluent as described in the copending application of Gerald A. Ibach et al., Serial No. 516,868, filed January 3, 1944 (now U. S. Patent 2,412,220, issued December 10, 1946), in which the formation of siliceous deposits is prevented by washing the hydrocarbon conversion effluent with a suitable alkali solution after removal of organic fluorine compounds.

An object of the present invention is to provide a process for preventing the formation of siliceous deposits in condensers of fractionating equipment used for the separation of the product of a hydrocarbon conversion process.

It is also an object to prevent the plugging of condensers and tubing wherein siliceous deposits are accumulated as the result of the presence of silicon tetrafluoride in the condensate.

Another object is to prevent the corrosion of fractionating equipment caused by the liberation of acids in the condensers and tubing of the fractionating equipment.

A still further object is to remove inorganic fluorine and silicon compounds from a hydrocarbon conversion effluent from an alkylation process using a fluorine-containing alkylation catalyst.

A further object is to increase the efficiency of a caustic wash solution for removing silicon tetrafluoride from a hydrocarbon stream.

Another object is to prevent the precipitation of relatively insoluble fluorides in a caustic solution used to remove silicon tetrafluoride and like compounds from a hydrocarbon conversion effluent.

Other objects and advantages will appear obvious to those skilled in the art from the accompanying disclosure and description.

According to this invention inorganic fluorine and/or silicon compounds present in an organic mixture may be removed therefrom by contacting the mixture with an alkaline solution. Accordingly, in hydrocarbon conversion processes in which a hydrocarbon conversion effluent contains silicon tetrafluoride, the hydrocarbon effluent is treated with an aqueous alkaline solution to remove silicon tetrafluoride by reacting the silicon tetrafluoride with the alkali of the solution under conditions such that the products of reaction are dissolved in the aqueous solution and removed therewith.

Preferably the alkaline solution comprises a solution of an alkali metal hydroxide, such as a solution of sodium hydroxide in water. Aqueous solutions of potassium hydroxide, sodium bicarbonate, sodium carbonate, ammonium hydroxide, borax, or similar alkaline substances or mixtures thereof may be used, although their effectiveness for the purposes of this invention is somewhat less than that of an aqueous solution of sodium hydroxide. A solution of sodium hydroxide between 0.1 and about 10 per cent by weight (between about 0.045 and 4.5 mol per cent) is preferred.

This invention is applicable to the removal of various silicon impurities other than silicon tetrafluoride which may also be present in the hydrocarbon conversion effluent, such as silicic acid, fluosilicic acid, ferrous fluosilicate, etc. Typical reaction equations between such silicon impurities and sodium hydroxide may be as follows:

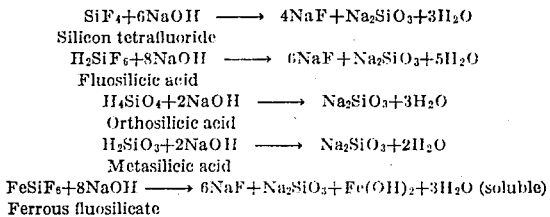

Ferrous fluosilicate

The treatment of the organic mixture containing the silicon impurity, such as silicon tetrafluoride, is generally effected in the liquid phase; however, it is within the scope of this invention to contact an alkaline solution with a vaporous organic mixture, although such treatment of a vaporous organic mixture is less desirable than the treatment of a liquid organic mixture. The treatment of the organic mixture with the alkaline solution may be carried out either as a batch process or a continuous process.

In the preferred embodiment of this invention as applied to a hydrocarbon conversion process using a fluorine-containing catalyst, a hydrocarbon conversion effluent is passed to a bauxite treater to remove organic fluorine compounds contained in the effluent. Thereafter in order to remove silicon tetrafluoride and other inorganic fluorine and/or silicon compounds formed in the bauxite treater, the hydrocarbon effluent, generally in a liquid phase, is passed to a mixing zone where the liquid hydrocarbon effluent is contacted or thoroughly mixed with an alkaline solution, such as an aqueous solution of sodium hydroxide. After the materials are thoroughly mixed they are passed to a settling zone for a phase separation of the alkaline solution from the liquid hydrocarbon effluent. Obviously, other methods may be used to separate the alkaline solution from the hydrocarbon effluent without departing from the scope of this invention. From the settling zone an alkaline solution is removed and recycled, if desired, to the mixing zone. A liquid hydrocarbon phase, substantially free from silicon tetrafluoride, is passed from the settling zone to subsequent treating equipment for the separation and recovery of the products of the process.

In case some of the alkaline solution is entrained in the hydrocarbon phase this entrained solution may be removed by filtering the liquid hydrocarbon phase through a suitable contact material. Any type of filtering or contact material may be used to remove the entrained alkaline solution from the organic mixture. Such contact material for filtering comprises petroleum coke, wood charcoal and the like and such metal filters as screenings or turnings of copper, silver, Monel metal and other metals or metal alloys which are relatively inert to the various contaminants in the organic mixture. Flint rock has also been found to be a suitable filtering medium. The shape of the contact material may be in the form of filings, beads, Raschig rings, etc. Filtration of the purified hydrocarbon effluent may not be necessary, and in most cases filtration is used only as a safety measure to prevent the carry-over of the alkaline solution when operating conditions are such that substantial amounts of the alkaline solution are entrained.

The presence of precipitates during the treating process often obstructs the flow of fluids through the treating equipment and decreases the efficiency of removal of the silicon tetrafluoride, etc. In actual operation the prevention of the formation of precipitates may be accomplished by controlling the concentration of the relatively insoluble fluorides and silicates in the aqueous solution. It has been found in the use of a sodium hydroxide solution that sodium fluoride and sodium silicate are formed by reaction with the inorganic fluorine and/or silicate compounds in the hydrocarbon effluent, and that the sodium fluoride and sodium silicate are soluble in the aqueous solution within approximately the following limits: (1) the maximum allowable concentration of sodium fluoride in a sodium hydroxide solution is expressed by the empirical equation;

$$\text{Log } y = -0.051x + \frac{z+769}{1640}$$

in which equation $y$ is the concentration of sodium fluoride in per cent by weight, $x$ is the total alkalinity of the solution expressed as per cent by weight of sodium hydroxide, and $z$ is the temperature of the aqueous solution in degrees Fahrenheit; and (2) the maximum allowable concentration of sodium silicate is equal to the free alkalinity of the solution expressed as per cent by weight of sodium hydroxide.

As contained in this specification total alkalinity may be defined as the hydrochloric acid titration of the alkaline solution calculated as weight per cent sodium hydroxide, and free alkalinity may be defined as the hydrochloric acid titration of the alkaline solution after removal of sodium silicate from the solution calculated as weight per cent sodium hydroxide.

The above equation is accurate within the limits of experimental error, and, in general, is correct within about 5 per cent. The equation is limited to a total alkalinity between about 0.1 to about 10 per cent by weight and a temperature range between about 100 and about 200° F.

This equation for the maximum concentration of sodium fluoride in the aqueous solution was derived by plotting experimental data shown in the following Table I on semilogarithmic graph paper. The locus of points formed parallel straight lines having slopes of —0.051, and $y$ axis intercepts of log 0.546 at 100° F. and log 0.607 at 200° F.

TABLE I

*Approximate solubility of sodium fluoride in alkaline solution*

[Percent by weight]

| Total Alkalinity of Solution | Per cent NaF in solution at 100° F. | Per cent NaF in solution at 200° F. |
|---|---|---|
| 0 | 3.8 | 4.0 |
| 2.5 | 2.6 | 3.0 |
| 5 | 1.9 | 2.2 |
| 10 | 1.1 | 1.3 |

When operating a batch process for the removal of silicon tetrafluoride, etc., the alkaline solution is considered spent and must be replaced with fresh solution when the sodium fluoride or sodium silicate content reaches the maximum limit as set forth above. In a continuous process, a portion of the alkaline solution is continuously or intermittently withdrawn from the treating zone, and sufficient fresh water and hydroxide are added to the solution in the treating zone to maintain the sodium fluoride and sodium silicate content below the desired limit.

In general, an alkaline solution less than about 0.3 normal will give satisfactory results for the removal of fluorine and/or silicon compounds.

A sodium hydroxide solution with less than about 10 per cent by weight of sodium hydroxide, preferably between about 0.1 and about 2.5 weight per cent, will remove substantially all of the silicon tetrafluoride and other similar compounds from the hydrocarbon effluent.

To effect a substantially complete removal of silicon tetrafluoride, etc., each of the above limitations should be observed in order to prevent the formation of either or both of the relatively insoluble fluoride and silicate, either of which alone interferes with the operation of the process.

The preferred conditions of temperature and pressure for operation of the present process are a temperature between about 100 and about 200° F., although a temperature as low as 30° F. may be used in some cases, and sufficient pressure to maintain both the hydrocarbon effluent and the alkaline solution in the liquid phase.

In using the preferred concentration of sodium hydroxide in the aqueous solution, the ratio of alkaline solution to liquid hydrocarbon effluent is between about 0.8:1 and about 2:1, preferably this ratio is between about 0.9:1 and about 1.5:1, and it has been found that an alkaline solution to hydrocarbon effluent ratio of at least 1:1 gives the best results.

Usually the settling time for a liquid phase separation between the alkaline solution and the liquid hydrocarbon effluent in the settling zone varies between about 10 to about 25 minutes, and preferably is from about 15 to 20 minutes. Using the preferred settling time very little carry-over or entrainment of the alkaline solution is obtained and the filtration of the hydrocarbon effluent is generally unnecessary.

In actual plant operation using this process with the preferred conditions hereinbefore set forth, the removal of silicon tetrafluoride from the hydrocarbon effluent has been as high as about 96 per cent, which resulted in almost complete elimination of siliceous deposits in subsequent treating equipment. Previous to the use of the silicon tetrafluoride removal process of this invention, condensers of subsequent fractionating equipment had to be cleaned as often as every third or fourth day. Since the use of this invention these condensers have had to be cleaned only about every four months with fully satisfactory operation during that period.

The accompanying drawing represents diagrammatically one arrangement of apparatus in a process to which this invention may be applied. This embodiment includes a liquid phase alkylation of hydrocarbons in which hydrogen fluoride is used as a catalyst. The hydrocarbon feed comprising a mixture of low-boiling isoparaffins and olefins enters reactor 6 through line 4. Any desired type of reaction chamber or series of chambers may be employed without departing from the scope of this invention. Hydrogen fluoride is introduced through lines 7 and 4 to reactor 6. Alkylation of the hydrocarbon is accomplished under known conditions of pressure, temperature and residence time in reactor 6. The effluent therefrom passes through line 8 into separator 9 in which the effluent is separated into a liquid hydrocarbon-rich phase and a heavier liquid hydrogen fluoride-rich phase. The liquid hydrogen fluoride-rich phase is withdrawn from separator 9 through line 11 for purification (not shown) if desired, or may be recycled through lines 12 and 7 to reactor 6 as a catalyst for the alkylation reaction. The liquid hydrocarbon-rich phase containing some dissolved hydrogen fluoride passes from separator 9 to azeotrope tower 14 by line 13. Separation of a more or less azeotropic mixture of hydrocarbons and hydrogen fluoride is effected in azeotrope tower 14 by distillation. This azeotropic mixture passes as a vapor from tower 14 through line 16 and a condenser 17 back to separator 9. A liquid hydrocarbon stream substantially free from hydrogen fluoride but containing organic fluorine compounds formed during the alkylation reaction passes from the bottom of azeotrope tower 14 through line 19 to bauxite treater 21. The organic fluorine compounds which are formed as by-products of the hydrocarbon conversion are removed by treatment of the hydrocarbon effluent with suitable contact material, such as bauxite or alumina, in bauxite treater 21 at a temperature of about 195° F. and a pressure of about 210 pounds per square inch gage. When siliceous material, such as silica or various natural silicates, is present in the contact material, silicon tetrafluoride is formed and will appear in the contact material when the contact material is partially spent and/or when an economically desirable high flow rate is used. Water formed during defluorinating is generally present in the resulting effluent in an amount less than that required to saturate the liquid effluent, i. e., less than about 1 per cent by weight; while silicon tetrafluoride is usually present in the resulting effluent in an amount less than about 0.01 per cent by weight. A portion of the effluent from bauxite treater 21 may be recycled through the treater by line 23, if desired.

The effluent, now substantially free from organic fluorine compounds but containing silicon tetrafluoride and water as impurities, passes to mixer 27 by lines 22 and 26 and pump 24. An aqueous alkaline solution also enters mixer 27 by means of line 32 and pump 34. Pump 24 increases the pressure of the hydrocarbon effluent to a pressure of about 275 pounds per square inch gage in order to allow about a 35 pound per square inch pressure drop in mixer 27. Pump 34 also increases the pressure of the alkaline solution entering mixer 27 to about 275 pounds per square inch gage in order to compensate for pressure drop. The pressure drop in mixer 27 is usually from about 5 to about 40 pounds per square inch, preferably about 35 pounds per square inch, in order to achieve adequate mixing of the liquid hydrocarbon effluent and the alkaline solution. The alkaline solution entering mixer 27 through line 32 comprises generally an aqueous solution of sodium hydroxide having a concentration less than about 2.5 weight per cent sodium hydroxide. To obtain a high degree of removal of silicon tetrafluoride from the hydrocarbon effluent, a ratio of alkaline solution to hydrocarbon effluent between about 0.9:1 to about 1.5:1 is used, and generally a ratio of 1:1 or more is preferred. A mixer designed to handle from about 600 to about 800 barrels per hour of liquid hydrocarbon effluent is typical of many installations in hydrocarbon conversion processes. Using these conditions as set forth above the removal of silicon tetrafluoride is often as much as 95 per cent or more.

From mixer 27 the resulting mixture of hydrocarbon effluent and alkaline solution passes through line 28 to caustic settler 29 at a temperature of about 195° F. and a pressure of about 240 pounds per square inch gage. Using a sufficient settling time between about 15 and 20 minutes in settler 29, a substantially complete phase separation of liquid hydrocarbon effluent and alkaline solution is effected. Alkaline solution settles to the bottom of settler 29 and is removed therefrom by line 31 and may be recycled to mixer 27 through line 32 by means of pump 34.

When the sodium hydroxide solution has become spent or inadequate for further removal of the silicon tetrafluoride from the hydrocarbon effluent, the entire aqueous solution is withdrawn from settler 29 and discharged from the system through line 35. After discharge of the spent solution, a fresh solution which has the desired sodium hydroxide concentration of about 2.5 percent by weight is pumped into the system through line 32 and pump 34.

Alternatively, the alkaline solution may be maintained at a constant sodium hydroxide concentration and the insoluble fluoride and silicate maintained within the allowable range by continuously withdrawing a portion of the alkaline solution from the system through line 35 and by continuously adding an appropriate amount of fresh water and sodium hydroxide through line 32.

The liquid hydrocarbon phase is withdrawn from caustic settler 29 by means of line 36. This hydrocarbon effluent from caustic settler 29 is substantially free from silicon tetrafluoride and other inorganic fluorine and silicate compounds but may contain some entrained caustic solution. In order to remove any entrained alkaline solution from the hydrocarbon effluent from caustic settler 29, the effluent is passed to a filtration unit 37 containing a suitable ltering or contact material such as flint rock or other material as previously described. From filtration unit 37 the purified hydrocarbon effluent is passed to a fractionating system 39 by means of line 38. In fractionating system 39 the product of the alkylation and various low-boiling components of the hydrocarbon alkylation effluent are separated.

The fractionating system is diagrammatically represented by element 39 and may comprise several fractionators in series and/or in parallel. The alkylate product is withdrawn from fractionating system 39 through line 41. Propane and lighter hydrocarbons are withdrawn from fractionating system 39 through line 42. Isobutane is withdrawn from fractionating system 39 through line 43 and may be recycled as a portion of the feed through reactor 6, if desired. Normal butane separated in fractionating system 39 is withdrawn through line 44 and may be considered a product of the process or may be isomerized (not shown) to isobutane and used as a portion of the feed to reactor 6.

To prevent the build-up of excessive pressure in the alkylation system, a portion of the light gases, such as propane and lighter hydrocarbons, are vented from separator 9 through line 18.

EXAMPLE

A liquid hydrocarbon effluent containing silicon tetrafluoride was treated to remove the silicon tetrafluoride in a similar manner to that described hereinbefore. The hydrocarbon effluent was thoroughly mixed with an approximately 2.5 weight per cent sodium hydroxide solution and a phase separation was made between the liquid hydrocarbon effluent and the sodium hydroxide solution. The temperature was maintained at about 195° F. and a ratio of sodium hydroxide solution to liquid hydrocarbon effluent was maintained at about 1:1. The aqueous solution was continuously used until sodium fluoride or sodium silicate in the solution began to precipitate, then discarded and fresh solution used. The following Table II shows the composition of the liquid hydrocarbon effluent with respect to sodium tetrafluoride prior to treatment for removal of the fluoride and also after treatment.

TABLE II

Temperature, 195° F. [Per cent by weight]. Liquid phase

| Test Runs | Alkaline Solution | | | | | | $SiF_4$ in Hydrocarbon Effluent | | | |
|---|---|---|---|---|---|---|---|---|---|---|
| | Total Alkalinity, Per Cent as NaOH | $Na_2SO_3$ Per Cent of Solution | NaF Per Cent of Solution | Per Cent NaF Soluble in Solution | Free Alkalinity Per Cent as NaOH | Solution | Entering Per Cent of Effluent | Leaving Per Cent of Effluent | Removed Per Cent of Effluent | Per Cent Removed |
| 1 | 2.89 | 0.45 | 0.67 | 2.8 | 2.60 | Clear | .0069 | .0013 | .0056 | 81 |
| 2 | 3.15 | 0.62 | 1.07 | 2.8 | 2.75 | ...do | .0047 | .0005 | .0042 | 89 |
| 3 | 2.60 | 0.84 | 1.13 | 2.8 | 2.08 | ...do | .0012 | .0004 | .0008 | 67 |
| 4 | 2.38 | 1.45 | 1.60 | 2.9 | 1.43 | Cloudy | .0057 | .0006 | .0051 | 90 |
| Discard used solution and replace with fresh 2.5% NaOH solution | | | | | | | | | | |
| 5 | 3.37 | 0.62 | 0.56 | 2.6 | 2.98 | Clear | .0050 | .0005 | .0045 | 90 |
| 6 | 2.97 | 0.73 | 0.89 | 2.7 | 2.49 | ...do | .0043 | .0005 | .0038 | 89 |
| 7 | 3.07 | 1.45 | 1.49 | 2.8 | 2.12 | Cloudy | .0084 | .0011 | .0073 | 87 |
| Discard used solution and replace with fresh 2.5% NaOH solution | | | | | | | | | | |
| 8 | 2.90 | 0.17 | 0.09 | 2.8 | 2.78 | Clear | .0050 | .0004 | .0046 | 92 |
| 9 | 2.86 | 0.50 | 0.76 | 2.8 | 2.53 | ...do | .0073 | .0003 | .0070 | 96 |
| 10 | 2.53 | 1.06 | 1.24 | 2.9 | 1.87 | Cloudy | .0054 | .0004 | .0050 | 93 |
| Discard used solution and replace with fresh 2.5% NaOH solution | | | | | | | | | | |
| 11 | 2.56 | 0.28 | 0.08 | 2.9 | 2.38 | Clear | .0032 | .0006 | .0026 | 81 |
| 12 | 2.58 | 0.38 | 0.33 | 2.8 | 2.38 | ...do | .0031 | .0005 | .0026 | 84 |
| 13 | 1.90 | 0.56 | 0.69 | 3.1 | 1.54 | ...do | .0041 | .0003 | .0038 | 93 |
| 14 | 1.54 | 0.62 | 0.98 | 3.2 | 1.14 | ...do | .0038 | .0007 | .0031 | 82 |
| 15 | 1.69 | 0.95 | 1.22 | 3.2 | 1.03 | ...do | .0029 | .0005 | .0024 | 83 |
| 16 | 1.43 | 1.10 | 1.91 | 3.3 | 0.96 | Cloudy | .0078 | .0005 | .0073 | 94 |
| Discard used solution and replace with fresh 2.5% NaOH solution | | | | | | | | | | |
| 17 | 1.39 | 0.67 | 0.80 | 3.3 | 0.95 | Clear | .0051 | .0009 | .0042 | 82 |
| 18 | 1.32 | 0.84 | 1.20 | 3.3 | 0.77 | ...do | .0049 | .0006 | .0043 | 88 |
| 19 | 1.26 | 0.81 | 1.71 | 3.6 | 0.62 | Cloudy | .0063 | .0010 | .0053 | 84 |
| Discard used solution and replace with fresh 2.5% NaOH solution | | | | | | | | | | |

It is evident from the table above that the process of this invention accomplishes a high removal of silicon tetrafluoride from a hydrocarbon effluent containing the same. As much as 96 per cent of the silicon tetrafluoride is removed, when the preferred conditions of operation are observed, such as the concentration of sodium hydroxide, sodium fluoride, and sodium silicate in the aqueous solution.

Various other modifications of this invention may become apparent to those skilled in the art, and which modifications may be applied without departing from the scope of this invention.

I claim:

1. In a process involving the conversion of hydrocarbon in the presence of a fluorine-containing catalyst in which hydrocarbon conversion effluent is contacted with an organic fluorine-removing material containing a minor proportion of silica and thereby is contaminated with silicon tetrafluoride which is present in an amount less than about 0.1 per cent by weight, the method for removing silicon tetrafluoride from said hydrocarbon conversion effluent which comprises contacting said effluent with an aqueous solution of sodium hydroxide whereby silicon tetrafluoride reacts with sodium hydroxide to form sodium fluoride and sodium silicate, said aqueous solution containing between about 0.1 and about 10 per cent by weight of sodium hydroxide, maintaining the concentration of sodium silicate in said aqueous solution below the free alkalinity of said aqueous solution expressed as weight per cent of sodium hydroxide and the concentration of sodium fluoride in said aqueous solution below that represented by the following empirical equation:

$$\text{Log } y = -0.051x + \frac{z+769}{1640}$$

in which equation $y$ is the weight per cent concentration of sodium fluoride, $x$ is the total alkalinity of said aqueous solution expressed as weight per cent of sodium hydroxide and $z$ is the temperature of said aqueous solution in degrees Fahrenheit, maintaining the temperature of said aqueous solution and said hydrocarbon effluent between about 100 and about 200° F. and sufficient pressure to maintain said aqueous solution and said hydrocarbon effluent in the liquid phase during said contact, maintaining the ratio of liquid volumes of aqueous solution to hydrocarbon effluent between about 0.8:1 and about 2:1, separating said aqueous solution and said hydrocarbon effluent, and recovering a hydrocarbon effluent substantially free from silicon tetrafluoride.

2. In a process for the conversion of hydrocarbons in the presence of a fluorine-containing catalyst in which a hydrocarbon conversion effluent is contacted with an organic fluorine-removing material containing a minor proportion of silica and thereby is contaminated with at least one of the group consisting of (a) silicon tetrafluoride, (b) fluosilicic acid, and (c) a mixture of silicic acid and hydrogen fluoride, the method for removing such contaminants from said hydrocarbon conversion effluent which comprises contacting said effluent with an aqueous solution of an alkali metal hydroxide whereby such contaminants react with the alkali metal hydroxide to form an alkali metal fluoride and an alkali metal silicate, said aqueous solution containing a concentration of alkali metal hydroxide between about 0.1 and about 10 per cent by weight, a concentration of an alkali metal silicate not greater than the free alkalinity of said aqueous solution expressed in weight per cent of alkali metal hydroxide and a concentration of an alkali metal fluoride not greater than that represented by the following empirical equation:

$$\text{Log } y = -0.051x + \frac{z+769}{1640}$$

in which equation $y$ is the weight per cent concentration of alkali metal fluoride, $x$ is the total alkalinity of said aqueous solution expressed as weight per cent of alkali metal hydroxide and $z$ is the temperature of said aqueous solution in degrees Fahrenheit, maintaining the temperature of said aqueous solution between about 100 and about 200° F. and sufficient pressure to maintain said aqueous solution and said hydrocarbon effluent in the liquid phase during said contact and maintaining the ratio of liquid volume of aqueous solution to hydrocarbon effluent between about 0.8:1 and about 2:1.

3. In a process for the alkylation of a low-boiling isoparaffin with an olefin in the presence of hydrogen fluoride as a catalyst in which an alkylation effluent is contacted with bauxite containing a minor proportion of silica and thereby is contaminated with at least one of the group consisting of (a) silicon tetrafluoride, (b) fluosilicic acid, and (c) a mixture of hydrogen fluoride and silicic acid, the method for removing said contaminants from said alkylation effluent which comprises contacting said effluent with an aqueous solution of sodium hydroxide whereby such contaminants react with sodium hydroxide to form sodium fluoride and sodium silicate, said aqueous solution containing a concentration of sodium hydroxide between about 0.1 and about 10 per cent by weight, a concentration of sodium silicate not greater than the free alkalinity of said aqueous solution expressed as weight per cent of sodium hydroxide and a concentration of sodium fluoride not greater than that represented by the following empirical equation:

$$\text{Log } y = -0.051x + \frac{z+769}{1640}$$

in which equation $y$ is the weight per cent concentration of sodium fluoride, $x$ is the total alkalinity of said aqueous solution expressed as weight per cent of sodium hydroxide and $z$ is the temperature of said aqueous solution in degrees Fahrenheit, maintaining the temperature of said aqueous solution between about 100 and about 200° F. and sufficient pressure to maintain said aqueous solution and said alkylation effluent in the liquid phase during said contact, and maintaining the ratio of liquid volumes of aqueous solution to alkylation effluent between about 0.8:1 and about 2:1.

4. In a process for the removal of material selected from at least one of the group consisting of (a) silicon tetrafluoride, (b) fluosilicic acid, and (c) a mixture of hydrogen fluoride and silicic acid from a mixture of hydrocarbons containing the same which comprises contacting such a mixture with an aqueous solution of sodium hydroxide whereby such material from the aforesaid group reacts with the sodium hydroxide to form sodium fluoride and sodium silicate, the improvement which comprises treating said mixture with said aqueous solution in which the concentration of sodium hydroxide in the solution is between about 0.1 and about 10 per cent by weight, the concentration of sodium silicate is not greater than the free alkalinity of said aqueous solution expressed as weight per cent of sodium hydroxide and the concentration of sodium fluoride is below that expressed by the equation:

$$\text{Log } y = -0.051x + \frac{z+769}{1640}$$

in which equation $y$ is the weight per cent concentration of sodium fluoride, $x$ is the total alkalinity of said aqueous solution expressed as weight per cent of sodium hydroxide and $z$ is the temperature of said aqueous solution in degrees Fahrenheit; maintaining the temperature of said aqueous solution between about 100 and about 200° F. and sufficient pressure to maintain said aqueous solution and said mixture of hydrocarbons in the liquid phase during said contact; and maintaining the ratio of liquid volumes of aqueous solution to mixture of hydrocarbons between about 0.8:1 and about 2:1.

5. In a process for removing silicon tetrafluoride from a mixture of hydrocarbons containing the same which comprises contacting said mixture of hydrocarbons with a liquid aqueous solution of sodium hydroxide whereby silicon tetrafluoride reacts with the sodium hydroxide to form silicon fluoride and sodium silicate, the improvement which comprises treating said mixture with said aqueous solution in which the concentration of sodium hydroxide in the solution is between about 0.1 and about 10 per cent by weight, the concentration of sodium silicate is not greater than the free alkalinity of said aqueous solution expressed as weight per cent of sodium hydroxide and the concentration of sodium fluoride is below that expressed by the equation:

$$\text{Log } y = -0.051x + \frac{z+769}{1640}$$

in which equation $y$ is the weight per cent concentration of sodium fluoride, $x$ is the total alkalinity of said aqueous solution expressed as weight per cent of sodium hydroxide and $z$ is the temperature of said aqueous solution in degrees Fahrenheit; maintaining the temperature of said aqueous solution between about 100 and about 200° F. and sufficient pressure to maintain said aqueous solution and said mixture of hydrocarbons in the liquid phase during said contact; and maintaining the ratio of liquid volumes of aqueous solution to mixture of hydrocarbons between about 0.8:1 and about 2:1.

JOHN WENDELL RALPH WILDMAN, Jr.

REFERENCES CITED

The following references are of record in the file of this patent:

UNITED STATES PATENTS

| Number | Name | Date |
|---|---|---|
| 1,869,781 | Shiffler et al. | Aug. 2, 1932 |
| 2,377,546 | Frey | June 5, 1945 |
| 2,412,220 | Ibach et al. | Dec. 10, 1946 |